Patented Feb. 5, 1952

2,584,665

UNITED STATES PATENT OFFICE 2,584,665

PYRIDYLCHLOROSILANES

Ben A. Bluestein, Schenectady, N. Y., assignor to General Electric Company, a corporation of New York No Drawing. Application April 14, 1950, Serial No. 156,051

2 Claims. (Cl. 260—290)

This invention is concerned with a novel composition of matter. More particularly, the invention relates to di-(2-pyridyl) dichlorosilane and a method for preparing the same.

The claimed composition of the matter has utility as an intermediate in the preparation of various resins, oils, rubbers, etc., in which is present the skeletal structure

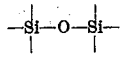

which is known as a polysiloxane linkage or silicone linkage.

Various methods may be employed to prepare di-(2-pyridyl) dichlorosilane. One method comprises passing a pyridyl halide, for example, 2-pyridyl chloride, 2-pyridyl bromide, etc., over silicon or an alloy of silicon, preferably at an elevated temperature and isolating the desired pyridyl halogenosilanes. It has been found that temperatures of the order of from about 250° to 500° C. are eminently suitable in this type of a reaction. In addition, increased yields of di-(2-pyridyl) dichlorosilane may be obtained if the passage of the pyridyl halide over the silicon is conducted in the presence of a catalyst for the reaction as, for example, copper, silver, etc., advantageously in a finely divided state. Alloys of silicon and various catalysts for the reaction may also be employed if desired. Besides conducting the reaction at atmospheric pressure, it will be apparent to those skilled in the art that the reaction may be effected at super-atmospheric pressures employing suitable pressure reactors for the purpose.

In order that those skilled in the art may better understand how the claimed compound may be prepared, the following example is given by way of illustration. All parts are by weight.

Example 1

A mixture comprising 85 parts finely divided silicon and 6 parts finely divided silver powder was placed in a vertical reactor provided with suitable heating means. This mixture was heated to a temperature of about 350° to 380° C., and thereafter about 36 parts liquid 2-chloropyridine were slowly passed downward through the vertical reactor for a period of about 6 hours. The liquid reaction product obtained as a result of the passage of the 2-chloropyridine was vacuum distilled at about 2 mm. pressure while applying heat until a pot temperature of 90° C. was attained. The residue which remained was sublimed under high vacuum using an oil bath maintained at around 90° C. This sublimation step gave a white-tan sublimate which was hygroscopic. Analysis of this compound showed it to comprise essentially di-(2-pyridyl) dichlorosilane as evidenced by the fact that it was found to contain 47.2% carbon and 29.7% chlorine (theoretical 47.06% carbon and 27.8% chlorine).

Di-(2-pyridyl) dichlorosilane can be hydrolyzed under suitable conditions by itself to give silicone oils containing silicon-bonded pyridyl groups. In addition, the di-(2-pyridyl) dichlorosilane can be cohydrolyzed with various other organohalogenosilanes, for example, dimethyldichlorosilane, diphenyldichlorosilane, mixtures of dimethyldichlorosilane and methyltrichlorosilane to give various silicone oils, rubbers, resins, etc., which have outstanding utility in high temperature applications for which other resins, oils and rubbers, free of the siloxane structure are unsuitable. Salts of this compound may be useful as emulsifying agents, ion exchange agents, etc.

It will, of course, be apparent that other pyridyl halogenosilanes (including my claimed compound) corresponding to the general formula

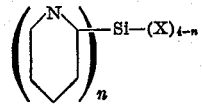

where $n$ is an integer equal to from 1 to 3 and X is a halogen, e. g., chlorine, bromine, etc., may also be prepared by methods similar to that described above or by the use of Grignard reagents. Also, compounds corresponding to the general formula

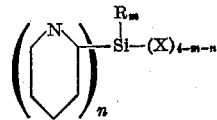

where R is a monovalent hydrocarbon, $n=1$ or 2, and $m=1$ or 2, the sum of $m$ and $n$ being equal to at most 3, may also be prepared by methods well known in the art. Pyridyl derivatives substituted in the 3- and 4-positions similar to the above-described 2-positioned pyridyl derivative may also be prepared similarly as above by using as the starting material, for instance, a 3-halopyridine or a 4-halopyridine, e. g., 3-chloropyridine and 4-chloropyridine.

What I claim as new and desire to secure by Letters Patent of the United States is:

1. The method of making di-(2-pyridyl) dichlorosilane which comprises passing liquid 2- chloropyridine over heated silicon while the latter is maintained at a temperature of from about 250° to 500° C.

2. The method of preparing di-(2-pyridyl) dichlorosilane which comprises passing liquid 2-chloropyridine over a contact mass comprising silicon and silver in which the contact mass is maintained at a temperature of from about 350° to 380° C., and thereafter isolating the aforementioned di-(2-pyridyl) dichlorosilane.

BEN A. BLUESTEIN.

REFERENCES CITED

The following references are of record in the file of this patent:

UNITED STATES PATENTS

| Number | Name | Date |
|---|---|---|
| 2,238,669 | Wiley | Apr. 15, 1941 |
| 2,444,784 | Meals | July 6, 1948 |
| 2,481,052 | Warrich | Sept. 6, 1949 |
| 2,466,413 | Gilliam | Apr. 5, 1949 |
| 2,527,333 | Sowa | Oct. 24, 1950 |